US009458282B2

(12) United States Patent
Greszta-Franz et al.

(10) Patent No.: US 9,458,282 B2
(45) Date of Patent: Oct. 4, 2016

(54) POLYURETHANE SEALING COMPOUNDS

(75) Inventors: Dorota Greszta-Franz, Solingen (DE);
Hans-Josef Laas, Odenthal (DE); Jens Krause, Mours Saint Eusèbe (FR);
Dieter Mager, Leverkusen (DE);
Christian Wamprecht, Neuss (DE)

(73) Assignee: Covestro Deutchland AG, Leverkusen (DE)

( * ) Notice: Subject to any disclaimer, the term of this patent is extended or adjusted under 35 U.S.C. 154(b) by 22 days.

(21) Appl. No.: 13/145,381

(22) PCT Filed: Jan. 13, 2010

(86) PCT No.: PCT/EP2010/000125
§ 371 (c)(1),
(2), (4) Date: Jul. 20, 2011

(87) PCT Pub. No.: WO2010/083957
PCT Pub. Date: Jul. 29, 2010

(65) Prior Publication Data
US 2011/0281966 A1    Nov. 17, 2011

(30) Foreign Application Priority Data
Jan. 22, 2009    (DE) .................. 10 2009 005 712

(51) Int. Cl.
C08G 18/09    (2006.01)
C08G 18/78    (2006.01)
C08G 18/18    (2006.01)
C08G 18/42    (2006.01)
C08G 18/79    (2006.01)

(52) U.S. Cl.
CPC ......... *C08G 18/7837* (2013.01); *C08G 18/092* (2013.01); *C08G 18/1875* (2013.01); *C08G 18/4238* (2013.01); *C08G 18/4277* (2013.01); *C08G 18/792* (2013.01)

(58) Field of Classification Search
CPC ............ C08G 18/092; C08G 18/4277; C08G 18/7837
USPC ................ 521/172, 159; 528/59, 84
See application file for complete search history.

(56) References Cited

U.S. PATENT DOCUMENTS

| 2,834,748 | A | | 5/1958 | Bailey et al. |
| 2,917,480 | A | | 12/1959 | Bailey et al. |
| 3,262,901 | A | * | 7/1966 | Lord .......................... 524/839 |
| 4,096,162 | A | | 6/1978 | Windemuth et al. |
| 4,160,080 | A | | 7/1979 | Koenig et al. |
| 4,556,600 | A | | 12/1985 | Kraemling et al. |
| 4,692,384 | A | * | 9/1987 | Pedain et al. .............. 428/423.3 |
| 4,772,639 | A | | 9/1988 | Pilger et al. |
| 4,774,264 | A | | 9/1988 | Weber et al. |
| 4,837,359 | A | | 6/1989 | Woynar et al. |
| 4,960,848 | A | | 10/1990 | Scholl et al. |
| 4,981,880 | A | * | 1/1991 | Lehmann et al. ............ 521/174 |
| 4,994,541 | A | | 2/1991 | Dell et al. |
| 5,076,958 | A | | 12/1991 | Pedain et al. |
| 5,126,170 | A | | 6/1992 | Zwiener et al. |
| 5,436,336 | A | * | 7/1995 | Bruchmann et al. ......... 544/193 |
| 5,502,150 | A | * | 3/1996 | Steppan et al. ................. 528/60 |
| 5,633,289 | A | * | 5/1997 | Nakamura et al. ............. 521/51 |
| 5,914,383 | A | | 6/1999 | Richter et al. |
| 6,037,383 | A | * | 3/2000 | Krech et al. .................. 521/155 |
| 6,316,662 | B1 | | 11/2001 | Woo et al. |
| 6,730,768 | B2 | | 5/2004 | Heidbreder et al. |
| 2002/0028930 | A1 | | 3/2002 | Laas et al. |
| 2007/0078255 | A1 | * | 4/2007 | Mager et al. .................. 528/59 |
| 2007/0191502 | A1 | * | 8/2007 | Free et al. ................... 521/172 |
| 2007/0238837 | A1 | * | 10/2007 | Mager et al. ................. 525/454 |
| 2009/0039551 | A1 | | 2/2009 | Kasper et al. |

FOREIGN PATENT DOCUMENTS

| CA | 1335990 | C | 6/1995 |
| CA | 2219693 | A1 | 4/1999 |
| DE | 1012602 | B | 7/1957 |
| DE | 1670666 | A1 | 7/1971 |
| DE | 1719238 | A1 | 1/1972 |
| DE | 2558523 | A1 | 7/1977 |
| DE | 2622951 | A1 | 11/1977 |
| DE | 2948419 | A1 | 8/1981 |
| DE | 3700209 | A1 | 7/1988 |
| DE | 3900053 | A1 | 7/1990 |
| DE | 19701835 | A1 | 7/1998 |
| EP | 0000194 | A1 | 1/1979 |
| EP | 0026123 | A1 | 4/1981 |
| EP | 0081701 | A1 | 6/1983 |
| EP | 0275010 | A2 | 7/1988 |
| EP | 0330966 | A2 | 9/1989 |
| EP | 0336205 | A2 | 10/1989 |

(Continued)

OTHER PUBLICATIONS

Vieweg, R., et al., "Polyurethane," Kunststoff-Handbuch, vol. VII, Munich 1966, pp. 108-109, 453-455 and 507-510.
Adam. N., et al., "Polyurethanes", Ullmann's Encyclopedia of Industrial Chemistry, Electronic Release, 7th ed., chap. 3.2-3.4, Wiley-VCH, Weinheim 2005.
Laas, H.J., et al., "The Synthesis of Aliphatic Poyisocyanates—Coatings Isocyanates of Biuret, Isocyanurate, or Uretdione Structure," J. prakt. Chem. (1994), vol. 336, pp. 185-200—*including the original version in German and its English language translation.*

*Primary Examiner* — Peter F Godenschwager
(74) *Attorney, Agent, or Firm* — Drinker Biddle & Reath LLP

(57) ABSTRACT

The invention relates to the use of polyurethane sealing compounds for the production of light-fast compact or foamed polyurethane bodies or polyurethane urea bodies which have excellent mechanical and optical properties and especially a very high thermostability.

17 Claims, No Drawings

(56) References Cited

FOREIGN PATENT DOCUMENTS

| | | |
|---|---|---|
| EP | 0339396 A1 | 11/1989 |
| EP | 0403921 A2 | 12/1990 |
| EP | 0496208 A2 | 7/1992 |
| EP | 0524500 A1 | 1/1993 |
| EP | 0524501 A1 | 1/1993 |
| EP | 0649866 A1 | 4/1995 |
| EP | 0659792 A2 | 6/1995 |
| EP | 0689556 A1 | 1/1996 |
| EP | 0798299 A1 | 10/1997 |
| EP | 0896009 A1 | 2/1999 |
| EP | 0937110 A1 | 8/1999 |
| EP | 0978523 A1 | 2/2000 |
| EP | 1000955 A1 | 5/2000 |
| EP | 1174428 A2 | 1/2002 |
| EP | 1640394 A1 | 3/2006 |
| EP | 1721920 A1 | 11/2006 |
| EP | 1767559 A1 | 3/2007 |
| GB | 994890 A | 6/1965 |
| GB | 1143205 A | 2/1969 |
| GB | 1145952 A | 3/1969 |
| GB | 1534258 A | 11/1978 |
| JP | 07118263 A | 5/1995 |
| WO | WO-94/21702 A1 | 9/1994 |
| WO | WO-98/14492 A1 | 4/1998 |
| WO | WO-2007/107210 A1 | 9/2007 |

* cited by examiner

POLYURETHANE SEALING COMPOUNDS

CROSS-REFERENCE TO RELATED APPLICATIONS

This application is a national stage application (under 35 U.S.C. §371) of PCT/EP2010/000125, filed Jan. 13, 2010, which claims benefit of German application 10 2009 005 712.9, filed Jan. 22, 2009, both of which are incorporated herein by reference in their entirety for all their useful purposes.

BACKGROUND

The production of lightfast polyurethane or polyurethane-urea elastomers using aliphatic and/or cycloaliphatic polyisocyanates is known.

There is at present a growing market interest in flexible, light-resistant and weather-resistant polyurethane and polyurethane-urea compositions for a variety of different applications, for example for the production of components for automotive or furniture applications, as sealing compounds for window glass encapsulation for example, or as potting compounds for electronic or optoelectronic components.

The production of elastic lightfast polyurethane or polyurethane-urea elastomers has already been described many times. The aliphatic and/or cycloaliphatic diisocyanates available in industry, such as for example 1,6-diisocyanatohexane (HDI), 1-isocyanato-3,3,5-trimethyl-5-isocyanatomethylcyclohexane (isophorone diisocyanate, IPDI) and/or 2,4'- and/or 4,4'-diisocyanatodicyclohexylmethane ($H_{12}$-MDI) or oligomeric derivatives of these diisocyanates, are generally used as polyisocyanate components.

For example, WO 1998/014492 describes a reaction injection moulding (RIM) process for the production of optionally foamed, lightfast, flexible or semi-flexible polyurethane elastomers, wherein a crude IPDI trimer which contains monomeric IPDI and can additionally contain up to 10 wt. % of an IPDI prepolymer and optionally up to 5 wt. % of further monomeric diisocyanates is reacted with a combination of polymeric polyether polyols, hydroxy-functional low-molecular-weight chain extenders and an amine-type initiator component in the presence of organometallic compounds as catalysts.

According to the teaching of EP-A 0 275 010, elastic, light-resistant, optionally foamed polyurethane mouldings can also be produced using mixtures of low-monomer HDI trimers or HDI/IPDI mixed trimers containing at least 10 wt. % of monomeric isophorone diisocyanates as the polyisocyanate component and reaction partners which are at least difunctionally reactive to isocyanate groups.

Common to both processes is the disadvantage that they work with large amounts of low-molecular-weight monomeric diisocyanates, which are classed as toxic materials and in some cases exhibit a considerable vapour pressure. For occupational health reasons the processing of these monomeric diisocyanates requires a very high level of safety precautions to be taken. There is also the possibility, particularly if a polyisocyanate excess is used, as proposed for example in EP-A 0 275 010, of unreacted monomeric diisocyanate remaining in the manufactured moulding for some time and slowly evaporating from it.

There has been no shortage of attempts to produce elastic, lightfast polyurethane compositions on the basis of low-monomer, higher-molecular-weight, non-toxic polyisocyanates, in particular those based on the known aliphatic polyisocyanates having a biuret, isocyanurate or uretdione structure.

WO 2007/107210 describes crosslinked flexible polyurethane compositions which are used for example as a silicone substitute in the production of seals. These polyurethanes consist of mixtures of polymeric diols and triols and up to 50 wt. % of special monofunctional compounds as "internal plasticisers", which are preferably cured with low-monomer, at least trifunctional aliphatic polyisocyanates, for example trimers of HDI. Although the monoalcohols used as internal plasticisers, such as for example N-hydroxyalkyl-substituted aromatic sulfonic acid esters or amides or monofunctional polyether alcohols, give the polyurethane composition a permanent elasticity and prevent embrittlement of the material as they are permanently incorporated by chemical means and cannot migrate out of the moulding, they also considerably reduce the isocyanate functionality and hence the network density, and this has a negative influence inter alia on the resistance to solvents and chemicals.

The same applies to the highly undercured polyurethanes described in EP-A 0 026 123, such as can be obtained by the reaction of polyfunctional polyols with low-monomer polyisocyanates, for example HDI biurets, in an equivalents ratio of isocyanate to hydroxyl groups of 0.2 to 0.6. Such undercured polyurethane compositions are extremely soft, generally tacky and unsuitable for the production of mouldings. They are used as an interlayer or adhesive in the production of multilayer glass, glass/plastic or plastic composite sheets, for safety glass for example.

DESCRIPTION OF PREFERRED EMBODIMENTS

The object of the present invention was to provide novel flexible and elastic, light-resistant and weather-resistant polyurethane or polyurethane-urea elastomers which do not present the disadvantages of the known elastic polyurethane compositions. The novel elastomer compositions should be based on non-toxic raw materials and should be able to be processed by conventional methods, for example by simple casting by hand or by means of suitable machines, for example by the RIM process, to produce highly crosslinked yet at the same time soft and flexible moulded articles.

This object was achieved by the provision of the polyurethanes and polyurethane ureas described in more detail below.

The invention described in more detail below is based on the surprising observation that highly elastic, light-resistant and weather-resistant polyurethane and/or polyurea compositions which are characterised by an outstanding resistance to chemical, mechanical and thermal loading can be produced using special highly functional low-monomer polyisocyanate components in which, in addition to isocyanurate structures, ester group-containing polyol components are incorporated via allophanate structures.

HDI polyisocyanates containing both isocyanurate and allophanate groups have already been described in EP-A 0 659 792 and CA-A 2 219 693 among others as possible starting components for the production of polyurethane mouldings by means of a reaction injection moulding process. However, these are the low-viscosity and low-functional allophanate and isocyanurate group-containing polyisocyanates known from EP-A 0 496 208, EP-A 0 524 500 and EP-A 0 524 501, which can be produced from simple monoalcohols, such as for example n-butanol, and HDI, and not allophanate trimers based on ester group-containing higher-functional alcohols, such as are used according to the invention for the production of potting compounds. No specific reference to the particular suitability of HDI polyisocyanurates having ester group-containing polyols incorporated via allophanate structures for the production of flexible polyurethane and/or polyurea compositions can be drawn from either of the cited publications.

The present invention provides the use of low-monomer polyisocyanate components A), which can be obtained by reacting 1,6-diisocyanatohexane with amounts in molar deficit of an ester group-containing hydroxy-functional component B) in the presence of catalysts C) which accelerate the allophanatisation and simultaneous oligomerisation of isocyanate groups, terminating the reaction at a desired degree of conversion and removing the unreacted diisocyanate excess, for the provision of polyurethane and/or polyurea compositions which can be used for the production of lightfast compact or foamed polyurethane and/or polyurea articles.

The invention also provides a process for producing lightfast articles from these polyurethane and/or polyurea compositions by the solvent-free reaction of
A) the polyisocyanate component described above, optionally together with
D) further low-monomer aliphatic and/or cycloaliphatic polyisocyanates, with
E) reaction partners having an average functionality of 2.0 to 6.0 which are reactive to isocyanate groups, and optionally with incorporation of
F) further auxiliary agents and additives,
whilst maintaining an equivalents ratio of isocyanate groups to isocyanate-reactive groups of 0.5:1 to 2.0:1.

The polyisocyanate components A) used for the production of the novel lightfast articles from these polyurethane or polyurea compositions are any low-monomer, allophanate and isocyanate structure-containing reaction products of HDI with ester group-containing hydroxy-functional components B) known per se, such as can be obtained for example by the process disclosed in EP-A 0 336 205.

Suitable polyols B) for the production of the polyisocyanate component A) are in particular those having an average molecular weight, calculable from the functionality and hydroxyl value, of 134 to 3000, preferably 176 to 2000, and an average OH functionality of 1.8 to 4.0, preferably 2.0 to 3.0.

These are for example simple ester alcohols, such as for example hydroxypivalic acid neopentyl glycol esters, or the ester alcohols or ester alcohol blends known per se, such as can be produced for example by reacting polyhydric alcohols with deficit amounts of polybasic carboxylic acids, corresponding carboxylic anhydrides, corresponding polycarboxylic acid esters of low alcohols or lactones.

Suitable polyhydric alcohols for producing these ester alcohols B) are in particular those in the molecular weight range from 62 to 400, such as for example 1,2-ethanediol, 1,2- and 1,3-propanediol, the isomeric butanediols, pentanediols, hexanediols, heptanediols and octanediols, 1,10-decanediol, 1,2- and 1,4-cyclohexanediol, 1,4-cyclohexanedimethanol, 4,4'-(1-methylethylidene)-biscyclohexanol, 1,2,3-propanetriol, 1,1,1-trimethylolethane, 1,2,6-hexanetriol, 1,1,1-trimethylolpropane, 2,2-bis(hydroxymethyl)-1,3-propanediol, bis-(2-hydroxyethyl)hydroquinone, 1,2,4- and 1,3,5-trihydroxycyclohexane or 1,3,5-tris(2-hydroxyethyl) isocyanurate.

The acids or acid derivatives used to produce the ester alcohols B) can be of an aliphatic, cycloaliphatic, aromatic and/or heteroaromatic nature and optionally substituted, e.g. by halogen atoms, and/or unsaturated. Examples of suitable acids are for example polybasic carboxylic acids in the molecular weight range from 118 to 300 or derivatives thereof, such as for example succinic acid, adipic acid, sebacic acid, phthalic acid, phthalic anhydride, isophthalic acid, terephthalic acid, trimellitic acid, tetrahydrophthalic acid, maleic acid, maleic anhydride, dimeric and trimeric fatty acids, terephthalic acid dimethyl esters and terephthalic acid bis-glycol esters.

Mixtures of the starting compounds cited by way of example can also be used to produce the ester alcohols B). It is also possible to use mixtures of different ester alcohols of the cited type in the process according to the invention.

Ester polyols B) such as can be produced in a manner known per se from lactones and simple polyhydric alcohols as starter molecules with ring opening are preferably used to produce the polyisocyanate component A).

Suitable lactones for the production of these ester polyols are for example β-propiolactone, γ-butyrolactone, δ-valerolactone, ε-caprolactone, 3,5,5- and 3,3,5-trimethylcaprolactone or any mixtures of such lactones. The polyhydric alcohols in the molecular weight range from 62 to 400 cited above by way of example, or any mixtures of these alcohols, can be used as starter molecules for example.

The production of such lactone polyester polyols by ring-opening polymerisation generally takes place in the presence of catalysts such as for example Lewis or Brønsted acids, organic tin or titanium compounds, at temperatures of 20 to 200° C., preferably 50 to 200° C.

Particularly preferred ester group-containing hydroxy-functional components B) are ester diols in the aforementioned molecular weight range, in particular those based on ε-caprolactone.

An ancillary amount of ester group-free hydroxyl compounds in the molecular weight range from 32 to 400 can optionally also be used in the production of the polyisocyanate component A). These are for example simple monoalcohols, such as for example methanol, ethanol, n-propanol, isopropanol, n-butanol, isobutanol, sec-butanol, the isomeric pentanols, hexanols, octanols and nonanols, n-decanol, n-dodecanol, n-tetradecanol, n-hexadecanol, n-octadecanol, cyclohexanol, the isomeric methylcyclohexanols, hydroxymethylcyclohexane, 3-methyl-3-hydroxymethyloxetane, benzyl alcohol, phenol, the isomeric cresols, octyl phenols, nonyl phenols and naphthols, furfuryl alcohol and tetrahydrofurfuryl alcohol, or the polyhydric alcohols described above as suitable starting components for the production of the ester alcohols B), or any mixtures of these alcohols. Such ester group-free alcohols, if used at all, are used in amounts of up to 20 wt. %, preferably up to 10 wt. %, relative to the weight of the hydroxy-functional component B).

In the production of the polyisocyanate component A) used in the polyurethane or polyurea compositions used according to the invention HDI is reacted with the ester group-containing hydroxy-functional component B) whilst maintaining an equivalents ratio of isocyanate groups to hydroxyl groups of 4:1 to 50:1, preferably 6:1 to 40:1, particularly preferably 8:1 to 30:1.

As described above, any mixtures of suitable ester alcohols B) can also be used as the hydroxy-functional component B). The reaction of HDI with the hydroxy-functional component B) takes place in the presence of catalysts C), which accelerate the allophanatisation and simultaneous oligomerisation of isocyanate groups.

Suitable allophanatisation catalysts C) are for example metal carboxylates, metal chelates or tertiary amines of the type described in GB-A-0 994 890, which—as is proved in EP-A 0 000 194 by means of comparative examples—do not lead to pure allophanates but under appropriate reaction conditions additionally also form considerable proportions of dimeric and trimeric structures.

Such allophanatisation catalysts C) are in particular zinc compounds, such as for example zinc(II) stearate, zinc(II) n-octanoate, zinc(II)-2-ethyl-1-hexanoate, zinc(II)-naphthenate or zinc(II) acetylacetonate, tin compounds, such as for example tin(II) n-octanoate, tin(II)-2-ethyl-1-hexanoate, tin (II) laurate, dibutyl tin oxide, dibutyl tin dichloride, dibutyl tin diacetate, dibutyl tin dilaurate, dibutyl tin dimaleate or dioctyl tin diacetate, aluminium tri(ethylacetoacetate), iron (III) chloride, potassium octoate, manganese, cobalt or nickel compounds or any mixtures of these catalysts.

Preferred catalysts from this group are zinc compounds of the cited type. The use of zinc(II) n-octanoate, zinc(II)-2-ethyl-1-hexanoate and/or zinc(II) stearate is most particularly preferred.

Suitable catalysts C), which accelerate both the allophanatisation reaction and the trimerisation of isocyanate groups to isocyanate structures, are furthermore also the conventional trimerisation catalysts known from polyisocyanate chemistry, such as are described for example in J. Prakt. Chem. 336 (1994) 185-200, EP-A 0 649 866 (page 4, line 7 to page 5, line 15) or EP-A 0 896 009 (page 4, line 17 to 58). Trimerisation catalysts suitable as catalysts C) are for example quaternary ammonium carboxylates, such as for example N-(2-hydroxypropyl)-N,N,N-trimethylammonium-2-ethylhexanoate, N-(2-hydroxypropyl)-N,N,N-trimethyl-ammonium-2-formiate, quaternary ammonium hydroxides, such as for example tetramethyl, tetraethyl, trimethylstearyl and dimethylethylcyclohexyl ammonium hydroxide, N,N, N-trimethyl-N-(2-hydroxyethyl)ammonium hydroxide, N,N,N-trimethyl-N-(2-hydroxypropyl)ammonium hydroxide, N,N,N-trimethyl-(2-hydroxybutyl)ammonium hydroxide, N,N-dimethyl-n-dodecyl-N-(2-hydroxyethyl)ammonium hydroxide, N-(2-hydroxyethyl)-N,N-dimethyl-N-(2, 2'-dihydroxymethylbutyl)ammonium hydroxide, N-methyl-2-hydroxyethyl morpholinium hydroxide, N-methyl-N-(2-hydroxypropyl)pyrrolidinium hydroxide, N-dodecyl-tris-N-(2-hydroxyethyl)ammonium hydroxide, tetra-(2-hydroxyethyl)ammonium hydroxide, N,N,N-trimethyl-N-benzyl ammonium hydroxide, or quaternary ammonium and phosphonium hydrogen polyfluorides, such as for example tetrabutylphosphonium hydrogen difluoride.

Most particularly preferred catalysts from this group are N,N,N-trimethyl-N-(2-hydroxyethyl)ammonium hydroxide, N,N,N-trimethyl-N-(2-hydroxypropyl)ammonium hydroxide, N,N,N-trimethyl-N-(2-hydroxybutyl)ammonium hydroxide and in particular N,N,N-trimethyl-N-benzyl ammonium hydroxide.

Likewise suitable as catalysts C) are those which in addition to the allophanatisation reaction also accelerate primarily dimerisation and simultaneously to a lesser degree trimerisation of isocyanate groups, with formation of uretdione and isocyanurate structures, such as for example tertiary phosphines, of the type mentioned in EP-A 1 174 428 (page 3, line 32 to page 4, line 1).

tert-Phosphines which are suitable as catalysts C) are for example triethylphosphine, dibutylethylphosphine, tri-n-propylphosphine, triisopropylphosphine, tri-tert-butylphosphine, tribenzylphosphine, dicyclopentylbutylphosphine, tricyclopentylphosphine, benzyldimethylphosphine, dimethylphenylphosphine, tri-n-butylphosphine, triisobutylphosphine, triamylphosphine, trioctylphosphine or butyl phosphacyclopentane.

Preferred catalysts from this group are the cited trialkylphosphines. Tributylphosphine, trioctylphosphine and/or dicyclopentylbutylphosphine are most particularly preferred.

Depending on the chosen catalyst type, the catalysts C) are used in the production of the polyisocyanate component A) in an amount from 0.001 to 5 wt. %, preferably 0.005 to 2 wt. %, relative to the total weight of the reaction partners HDI and polyol component B) and can be added either before the start of the reaction or at any time during the reaction.

The polyisocyanate component A) is preferably produced without the use of solvents. Optionally, however, suitable solvents which are inert in respect of the reactive groups of the starting components can be incorporated. Suitable solvents are for example the conventional paint solvents known per se, such as for example ethyl acetate, butyl acetate, ethylene glycol monomethyl or ethyl ether acetate, 1-methoxypropyl-2-acetate, 3-methoxy-n-butyl acetate, acetone, 2-butanone, 4-methyl-2-pentanone, cyclohexanone, toluene, xylene, chlorobenzene, white spirit, more highly substituted aromatics, such as are sold for example under the names solvent naphtha, Solvesso®, Isopar®, Nappar® (Deutsche ExxonMobil Chemical GmbH, Cologne, DE) and Shellsol® (Deutsche Shell Chemie GmbH, Eschborn, DE), but also solvents such as propylene glycol diacetate, diethylene glycol dimethyl ether, dipropylene glycol dimethyl ether, diethylene glycol ethyl and butyl ether acetate, N-methyl pyrrolidone and N-methyl caprolactam, or any mixtures of such solvents.

In one possible embodiment, in the production of the polyisocyanate component A) HDI, optionally under inert gas, such as nitrogen for example, and optionally in the presence of a suitable solvent of the cited type, is weighed out at a temperature of between 20 and 100° C. Then the hydroxy-functional starting compound B) is added in the amount specified above and the reaction temperature for urethanisation is adjusted to a temperature of 30 to 120° C., preferably 50 to 100° C., optionally by means of a suitable action (heating or cooling). Following the urethanisation reaction, i.e. when the NCO content theoretically corresponding to a complete conversion of isocyanate and hydroxyl groups is reached, allophanatisation and oligomerisation are initiated by addition of a suitable catalyst C). Depending on the type and amount of catalyst used, the reaction which then begins requires temperatures in the range from 50 to 140° C.

In another possible embodiment, in order to produce the polyisocyanate component A) the catalyst C) to be incorporated is added to either the HDI and/or the isocyanate group-reactive component B) before the start of the actual reaction. In this case the urethane groups which are formed as intermediates spontaneously react further to form the desired allophanate structure. In this type of single-stage reaction process the starting compounds HDI and the isocyanate group-reactive component B), optionally containing the catalyst C), are weighed out and reacted, optionally under inert gas, such as nitrogen for example, generally at the optimal temperatures for allophanatisation and oligomerisation in the range from 50 to 140° C., preferably 60 to 120° C.

It is however also possible to add the catalyst C) to the reaction mixture at any point during the urethanisation reaction. In this embodiment a temperature generally in the range from 30 to 120° C., preferably 50 to 100° C., is set for the urethanisation reaction which takes place before the catalyst addition. After addition of a suitable catalyst C) the allophanatisation and oligomerisation reaction is finally performed at temperatures of 50 to 140° C., preferably 60 to 120° C.

In the production of the polyisocyanate component A) the progress of the reaction can be tracked by means of titrimetric determination of the NCO content, for example. The reaction is terminated when the desired NCO content is reached, preferably when the degree of modification (i.e. the percentage of NCO groups in the HDI used in the reaction mixture reacted to urethane and allophanate groups, optionally with oligomerisation) is 10 to 40%, preferably 20 to 30%. This can be done for example by cooling the reaction mixture to room temperature. The reaction is generally stopped, however, by the addition of suitable catalyst poisons, for example acid chlorides such as benzoyl chloride or isophthaloyl dichloride.

The reaction mixture is then preferably freed from volatile constituents (mainly excess monomeric HDI, solvents optionally used and, if a catalyst poison is not used, optionally active catalyst) by film distillation under high vacuum, for example under a pressure of below 1.0 mbar, preferably below 0.5 mbar, particularly preferably below 0.2 mbar, under as gentle conditions as possible, for example at a temperature of 100 to 200° C., preferably 120 to 180° C.

The accumulating distillates, which in addition to unreacted monomeric HDI contain solvents optionally used and, if a catalyst poison is not used, optionally active catalyst, can be used for oligomerisation again without difficulty.

In a further preferred embodiment, in the production of the polyisocyanate component A) the cited volatile constituents are separated from the oligomerisation product by extraction with suitable isocyanate group-reactive inert solvents, for example aliphatic or cycloaliphatic hydrocarbons such as pentane, hexane, heptane, cyclopentane or cyclohexane.

Irrespective of the type of process control and processing, the polyisocyanate components A) are generally obtained as clear, practically colourless resins, which have an average NCO functionality of 3.0 to 5.0, preferably 3.2 to 4,8, particularly preferably 3.6 to 4.5, and an NCO content of 4.0 to 21.0 wt. %, preferably 6.0 to 18.0 wt. %, particularly preferably 8.0 to 16.0 wt. %, and a residual content of monomeric HDI of less than 1 wt. %, preferably less than 0.5 wt. %, particularly preferably less than 0.3 wt. %.

The degree of allophanatisation, i.e. the percentage of urethane groups forming as intermediates from the hydroxyl groups of component B) which are converted to allophanate groups, determined for example by NMR spectroscopy, in the polyisocyanate components A) used according to the invention is at least 40%, preferably at least 50% and most particularly at least 60%. The molar ratio of oligomeric structures, i.e. in particular of the sum of uretdione and isocyanurate structures, to allophanate groups is generally from 10:90 to 60:40, preferably from 15:85 to 55:45, particularly preferably from 20:80 to 50:50.

In addition to the polyisocyanate components A) described above, further low-monomer aliphatic and/or cycloaliphatic polyisocyanates D) differing from A) are optionally additionally used to produce the lightfast polyurethane and/or polyurea compositions according to the invention. These are the known polyisocyanates obtainable by modification of simple diisocyanates and having a uretdione, isocyanurate, iminooxadiazinedione, urethane, allophanate, biuret and/or oxadiazinetrione structure, as described for example in J. Prakt. Chem. 336 (1994) 185-200, DE-A 1 670 666, DE-A 3 700 209, DE-A 3 900 053, EP-A 0 330 966, EP-A 0 339 396 and EP-A 0 798 299 by way of example. Suitable starting diisocyanates for the production of the polyisocyanate components D) are for example those in the molecular weight range from 140 to 400 having aliphatically and/or cycloaliphatically bonded isocyanate groups, such as for example 1,4-butane diisocyanate, HDI, 1,5-diisocyanato-2,2-dimethylpentane, 2,2,4- or 2,4,4-trimethyl-1,6-diisocyanatohexane, 1,10-diisocyanatodecane, 1,3- and 1,4-diisocyanatocyclohexane, 1-isocyanato-3,3,5-trimethyl-5-isocyanatomethyl cyclohexane (isophorone diisocyanate, IPDI), 2,4'- and/or 4,4'-diisocyanatodicyclohexylmethane and 1,3-diisocyanato-2 (4)-methylcyclohexane, or mixtures thereof.

If they are used at all, these polyisocyanate components D) are used in an amount of up to 60 wt. %, preferably up to 50 wt. %, particularly preferably up to 40 wt. %, relative to the total weight of polyisocyanate components A) and D).

For the use according to the invention of the polyurethane and/or polyurea compositions, the polyisocyanate components A) described above, optionally mixed with the low-monomer aliphatic and/or cycloaliphatic polyisocyanates D), are reacted with any solvent-free isocyanate group-reactive reaction partners E) having an average functionality in the sense of the isocyanate addition reaction of 2.0 to 6.0, preferably 2.5 to 4.0, particularly preferably 2.5 to 3.5.

These are in particular the conventional polyether polyols, polyester polyols, polyether polyester polyols, polythioether polyols, polymer-modified polyether polyols, graft polyether polyols, in particular those based on styrene and/or acrylonitrile, polyether polyamines, hydroxyl group-containing polyacetals and/or hydroxyl group-containing aliphatic polycarbonates known from polyurethane chemistry, which conventionally have a molecular weight of 106 to 12000, preferably 250 to 8000. A broad overview of suitable reaction partners E) can be found for example in N. Adam et al.: "Polyurethanes", Ullmann's Encyclopedia of Industrial Chemistry, Electronic Release, 7th ed., chap. 3.2-3.4, Wiley-VCH, Weinheim 2005.

Suitable polyether polyols E) are for example those of the type mentioned in DE-A 2 622 951, column 6, line 65-column 7, line 47, or EP-A 0 978 523 page 4, line 45 to page 5, line 14, provided that they meet the aforementioned requirements regarding functionality and molecular weight, such polyether polyols being preferred in which primary hydroxyl groups make up at least 50%, preferably at least 80%, of the hydroxyl groups. Particularly preferred polyether polyols E) are addition products of ethylene oxide and/or propylene oxide with glycerol, trimethylolpropane, ethylenediamine and/or pentaerythritol.

Suitable polyester polyols E) are for example those of the type mentioned in EP-A 0 978 523 page 5, lines 17 to 47 or EP-B 0 659 792 page 6, lines 9 to 19, provided that they meet the aforementioned requirements, preferably those having a hydroxyl value of 20 to 650 mg KOH/g.

Suitable polythiopolyols E) are for example the known condensation products of thiodiglycol with itself or with other glycols, dicarboxylic acids, formaldehyde, aminocarboxylic acids and/or amino alcohols. Depending on the type of mixed components used, they are polythio-mixed ether polyols, polythioether ester polyols or polythioether ester amide polyols.

Polyacetal polyols suitable as component E) are for example the known reaction products of simple glycols, such as for example diethylene glycol, triethylene glycol, 4,4'-dioxethoxy diphenyl dimethylmethane (adduct of 2 mol ethylene oxide with bisphenol A) or hexanediol, with formaldehyde, or polyacetals produced by polycondensation of cyclic acetals, such as for example trioxane.

Amino polyethers or mixtures of aminopolyethers are also very suitable as component E), i.e. polyethers having isocyanate group-reactive groups made up of at least 50 equivalents %, preferably at least 80 equivalents %, of primary and/or secondary, aromatically or aliphatically bonded amino groups, the remainder being primary and/or secondary, aliphatically bonded hydroxyl groups. Suitable amino polyethers of this type are for example the compounds mentioned in EP-B-00 81 701, column 4, line 26 to column 5, line 40. Likewise suitable as starting component E) are amino-functional polyether urethanes or ureas, such as can be produced for example by the method described in DE-A 2 948 419 by hydrolysing isocyanate-functional polyether prepolymers, or polyesters in the aforementioned molecular weight range containing amino groups.

Other suitable isocyanate group-reactive components E) are for example also the special polyols described in EP-A 0 689 556 and EP-A 0 937 110, which are obtainable for example by reacting epoxidised fatty acid esters with aliphatic or aromatic polyols with epoxide ring opening.

Hydroxyl group-containing polybutadienes can optionally also be used as component E).

Polymercaptans, in other words polythio compounds, for example simple alkanethiols, such as for example methanedithiol, 1,2-ethanedithiol, 1,1-propanedithiol, 1,2-propanedithiol, 1,3-propanedithiol, 2,2-propanedithiol, 1,4-butanedithiol, 2,3-butanedithiol, 1,5-pentanedithiol, 1,6-hexanedithiol, 1,2,3-propanetrithiol, 1,1-cyclohexanedithiol, 1,2-cyclohexanedithiol, 2,2-dimethylpropane-1,3-dithiol, 3,4-dimethoxybutane-1,2-dithiol and 2-methylcyclohexane-2,3-dithiol, polythiols containing thioether groups, such as for example 2,4-dimercaptomethyl-1,5-dimercapto-3-thiapentane, 4-mercaptomethyl-1,8-dimercapto-3,6-dithiaoctane, 4,8-dimercaptomethyl-1,11-dimercapto-3,6,9-trithiaundecane, 4,7-dimercaptomethyl-1,11-dimercapto-3,6,9-trithiaundecane, 5,7-dimercaptomethyl-1,11-dimercapto-3,6,9-trithiaundecane, 4,5-bis(mercaptoethylthio)-1,10-dimercapto-3,8-dithiadecane, tetrakis(mercaptomethyl)methane, 1,1,3,3-tetrakis(mercaptomethylthio)propane, 1,1,5,5-tetrakis(mercaptomethylthio)-3-thiapentane, 1,1,6,6-tetrakis(mercaptomethylthio)-3,4-dithiahexane, 2-mercaptoethylthio-1,3-dimercaptopropane, 2,3-bis(mercaptoethylthio)-1-mercaptopropane, 2,2-bis(mercaptomethyl)-1,3-dimercaptopropane, bis(mercaptomethyl)sulfide, bis(mercaptomethyl)disulfide, bis(mercaptoethyl)sulfide, bis(mercaptoethyl)disulfide, bis(mercaptopropyl)sulfide, bis(mercaptopropyl)disulfide, bis(mercaptomethylthio)methane, tris(mercaptomethylthio)methane, bis(mercaptoethylthio)methane, tris(mercaptoethylthio)methane, bis(mercaptopropylthio)methane, 1,2-bis(mercaptomethylthio)ethane, 1,2-bis(mercaptoethylthio)ethane, 2-mercaptoethylthio)ethane, 1,3-bis(mercaptomethylthio)propane, 1,3-bis(mercaptopropylthio)propane, 1,2,3-tris(mercaptomethylthio)propane, 1,2,3-tris(mercaptoethylthio)propane, 1,2,3-tris(mercaptopropylthio)propane, tetrakis(mercaptomethylthio)methane, tetrakis(mercaptoethylthiomethyl)methane, tetrakis(mercaptopropylthiomethyl)methane, 2,5-dimercapto-1,4-dithiane, 2,5-bis(mercaptomethyl)-1,4-dithiane and oligomers thereof obtainable in accordance with JP-A 07 118 263, 1,5-bis(mercaptopropyl)-1,4-dithiane, 1,5-bis(2-mercaptoethylthiomethyl)-1,4-dithiane, 2-mercaptomethyl-6-mercapto-1,4-dithiacycloheptane, 2,4,6-trimercapto-1,3,5-trithiane, 2,4,6-trimercaptomethyl-1,3,5-trithiane and 2-(3-bis(mercaptomethyl)-2-thiapropyl)-1,3-dithiolane, polyester thiols, such as for example ethylene glycol-bis(2-mercaptoacetate), ethylene glycol-bis(3-mercaptopropionate), diethylene glycol(2-mercaptoacetate), diethylene glycol(3-mercaptopropionate), 2,3-dimercapto-1-propanol (3-mercaptopropionate), 3-mercapto-1,2-propanediol-bis(2-mercapto acetate), 3-mercapto-1,2-propanediol-bis(3-mercaptopropionate), trimethylolpropane-tris(2-mercaptoacetate), trimethylolpropane-tris(3-mercaptopropionate), trimethylolethane-tris(2-mercaptoacetate), trimethylolethane-tris(3-mercaptopropionate), pentaerythritol-tetrakis(2-mercaptoacetate), pentaerythritol-tetrakis(3-mercaptopropionate), glycerol-tris(2-mercaptoacetate), glycerol-tris(3-mercaptopropionate), 1,4-cyclohexanediol-bis(2-mercapto acetate), 1,4-cyclohexanediol-bis(3-mercaptopropionate), hydroxymethyl sulfide-bis(2-mercaptoacetate), hydroxymethyl sulfide-bis(3-mercaptopropionate), hydroxyethyl sulfide (2-mercaptoacetate), hydroxyethyl sulfide (3-mercaptopropionate), hydroxymethyl disulfide (2-mercaptoacetate), hydroxymethyl disulfide (3-mercaptopropionate), (2-mercaptoethyl ester) thioglycolate and bis (2-mercaptoethyl ester) thiodipropionate as well as aromatic thio compounds, such as for example 1,2-dimercaptobenzene, 1,3-dimercaptobenzene, 1,4-dimercaptobenzene, 1,2-bis(mercaptomethyl)benzene, 1,4-bis(mercaptomethyl)benzene, 1,2-bis(mercaptoethyl)benzene, 1,4-bis(mercaptoethyl)benzene, 1,2,3-trimercaptobenzene, 1,2,4-trimercaptobenzene, 1,3,5-trimercaptobenzene, 1,2,3-tris(mercaptomethyl)benzene, 1,2,4-tris(mercaptomethyl)benzene, 1,3,5-tris(mercaptomethyl)benzene, 1,2,3-tris(mercaptoethyl)benzene, 1,3,5-tris(mercaptoethyl)benzene, 1,2,4-tris(mercaptoethyl)benzene, 2,5-toluenedithiol, 3,4-toluenedithiol, 1,4-naphthalenedithiol, 1,5-naphthalenedithiol, 2,6-naphthalenedithiol, 2,7-naphthalenedithiol, 1,2,3,4-tetramercaptobenzene, 1,2,3,5-tetramercaptobenzene, 1,2,4,5-tetramercaptobenzene, 1,2,3,4-tetrakis(mercaptomethyl)benzene, 1,2,3,5-tetrakis(mercaptomethyl)benzene, 1,2,4,5-tetrakis(mercaptomethyl)benzene, 1,2,3,4-tetrakis(mercaptoethyl)benzene, 1,2,3,5-tetrakis(mercaptoethyl)benzene, 1,2,4,5-tetrakis(mercaptoethyl)benzene, 2,2'-dimercaptobiphenyl and 4,4'-dimercaptobiphenyl, are particularly suitable as isocyanate group-reactive components E) for the production of articles from polyurethane and/or polyurea compositions having a particularly high refraction of light.

Preferred polythio compounds E) are polythioether thiols and polyester thiols of the cited type. Particularly preferred polythio compounds E) are 4-mercaptomethyl-1,8-dimercapto-3,6-dithiaoctane, 2,5-bismercaptomethyl-1,4-dithiane, 1,1,3,3-tetrakis(mercaptomethylthio)propane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, trimethylolpropane-tris(3-mercaptopropionate), trimethylolethane-tris(2-mercaptoacetate), pentaerythritol-tetrakis(2-mercaptoacetate) and pentaerythritol-tetrakis(3-mercaptopropionate).

Sulfur-containing hydroxyl compounds are moreover also suitable as isocyanate group-reactive components E). Simple mercapto alcohols, such as for example 2-mercaptoethanol, 3-mercaptopropanol, 1,3-dimercapto-2-propanol, 2,3-dimercaptopropanol and dithioerythritol, alcohols containing thioether structures, such as for example di(2-hydroxyethyl)sulfide, 1,2-bis(2-hydroxyethylmercapto)ethane, bis(2-hydroxyethyl)disulfide and 1,4-dithiane-2,5-diol, or sulfur-containing diols having a polyester urethane, polythioester urethane, polyester thiourethane or polythioester thiourethane structure of the type specified in EP-A 1 640 394, can be cited here by way of example.

Low-molecular-weight, hydroxy- and/or amino-functional components, i.e. those in a molecular weight range from 62 to 500, preferably 62 to 400, can also be used as isocyanate-reactive compounds E) in the production of the lightfast articles according to the invention from these polyurethane and/or polyurea compositions.

These are for example the simple monohydric or polyhydric alcohols having 2 to 14, preferably 4 to 10 carbon atoms, such as have already been described above as suitable starting compounds for the production of the polyester alcohols B).

Examples of suitable low-molecular-weight amino-functional compounds are for example aliphatic and cycloaliphatic amines and amino alcohols having primary- and/or secondary-bonded amino groups, such as for example cyclohexylamine, 2-methyl-1,5-pentanediamine, diethanolamine, monoethanolamine, propylamine, butylamine, dibutylamine, hexylamine, monoisopropanolamine, diisopropanolamine, ethylenediamine, 1,3-diaminopropane, 1,4-diaminobutane, isophorone diamine, diethylenetriamine, ethanolamine, aminoethyl ethanolamine, diaminocyclohexane, hexamethylenediamine, methyliminobispropylamine, iminobispropylamine, bis(aminopropyl)piperazine, aminoethylpiperazine, 1,2-diaminocyclohexane, triethylenetetramine, tetraethylenepentamine, 1,8-p-diaminomenthane, bis(4-aminocyclohexyl)methane, bis(4-amino-3-methylcyclohexyl)methane, bis(4-amino-3,5-dimethylcyclohexyl)methane, bis(4-amino-2,3,5-trimethylcyclohexyl)methane, 1,1-bis(4-aminocyclohexyl)propane, 2,2-bis(4-aminocyclohexyl)propane, 1,1-bis(4-aminocyclohexyl)ethane, 1,1-bis(4-aminocyclohexyl)butane, 2,2-bis(4-aminocyclohexyl)butane, 1,1-bis(4-amino-3-methylcyclohexyl)ethane, 2,2-bis(4-amino-3-methylcyclohexyl)propane, 1,1-bis(4-amino-3,5-dimethylcyclohexyl)ethane, 2,2-bis(4-amino-3,5-dimethylcyclohexyl)propane, 2,2-bis(4-amino-3,5-dimethylcyclohexyl)butane, 2,4-diaminodicyclohexylmethane, 4-aminocyclohexyl-4-amino-3-methylcyclohexylmethane, 4-amino-3,5-dimethylcyclohexyl-4-amino-3-methylcyclohexylmethane and 2-(4-aminocyclohexyl)-2-(4-amino-3-methylcyclohexyl)methane.

Examples of aromatic polyamines, in particular diamines, having molecular weights below 500, which are suitable as isocyanate-reactive compounds E), are for example 1,2- and 1,4-diaminobenzene, 2,4- and 2,6-diaminotoluene, 2,4'- and/or 4,4'-diaminodiphenylmethane, 1,5-diaminonaphthalene, 4,4',4''-triaminotriphenylmethane, 4,4'-bis-(methylamino)diphenylmethane or 1-methyl-2-methylamino-4-aminobenzene, 1-methyl-3,5-diethyl-2,4-diaminobenzene, 1-methyl-3,5-diethyl-2,6-diaminobenzene, 1,3,5-trimethyl-2,4-diaminobenzene, 1,3,5-triethyl-2,4-diaminobenzene, 3,5,3',5'-tetraethyl-4,4'-diaminodiphenylmethane, 3,5,3',5'-tetraisopropyl-4,4'-diaminodiphenylmethane, 3,5-diethyl-3',5'-diisopropyl-4,4'-diaminodiphenylmethane, 3,3'-diethyl-5,5'-diisopropyl-4,4'-diaminodiphenylmethane, 1-methyl-2,6-diamino-3-isopropylbenzene, liquid polyphenyl-polymethylene-polyamine blends, such as are obtainable by known means by condensation of aniline with formaldehyde, and any mixtures of such polyamines. Particular mention can be made in this connection of mixtures of for example 1-methyl-3,5-diethyl-2,4-diaminobenzene with 1-methyl-3,5-diethyl-2,6-diaminobenzene in a weight ratio of 50:50 to 85:15, preferably 65:35 to 80:20.

The use of low-molecular-weight amino-functional polyethers having molecular weights below 500 is likewise possible. These are for example those having primary and/or secondary, aromatically or aliphatically bonded amino groups, in which the amino groups are optionally bonded to the polyether chains via urethane or ester groups and which can be obtained by known methods already described above for producing the higher-molecular-weight amino polyethers.

Sterically hindered aliphatic diamines having two secondary-bonded amino groups can optionally also be used as isocyanate group-reactive components E), such as for example the reaction products of aliphatic and/or cycloaliphatic diamines with maleic acid or fumaric acid esters known from EP-A 0 403 921, the bis-adduct of acrylonitrile with isophorone diamine obtainable according to the teaching of EP-A 1 767 559 or the hydrogenation products of Schiff bases obtainable from aliphatic and/or cycloaliphatic diamines and ketones, such as for example diisopropylketone, described for example in DE-A 19 701 835.

Preferred reaction partners E) for the isocyanate-functional starting components A) are the aforementioned polymeric polyether polyols, polyester polyols and/or amino polyethers, the cited low-molecular-weight aliphatic and cycloaliphatic polyhydric alcohols and the cited low-molecular-weight polyvalent amines, in particular sterically hindered aliphatic diamines having two secondary-bonded amino groups.

Also suitable as reaction partners for the isocyanate-functional starting components A) are any mixtures of the isocyanate group-reactive components E) cited above by way of example. Whereas pure polyurethane compositions are obtained using exclusively hydroxy-functional components E) and pure polyurea compositions are obtained using exclusively polyamines E), the use of amino alcohols or suitable mixtures of hydroxy- and amino-functional compounds as component E) leads to the production of polyurethane ureas, in which the equivalents ratio of urethane to urea groups can be adjusted as required.

Irrespective of the type of starting substances chosen, in the reaction of the polyisocyanate components A) with the isocyanate group-reactive components E) an equivalents ratio of isocyanate groups to isocyanate-reactive groups of 0.5:1 to 2.0:1, preferably 0.7:1 to 1.3:1, particularly preferably 0.8:1 to 1.2:1 is maintained.

In addition to the cited starting components A) and E), further auxiliary agents and additives F), such as for example catalysts, blowing agents, surface-active agents, UV stabilisers, foam stabilisers, antioxidants, release agents, fillers and pigments, can optionally be incorporated.

Conventional catalysts known from polyurethane chemistry can be used for example to accelerate the reaction. Examples cited here by way of example are tertiary amines, such as for example triethylamine, tributylamine, dimethylbenzylamine, diethylbenzylamine, pyridine, methylpyridine, dicyclohexylmethylamine, dimethylcyclohexylamine, N,N,N',N'-tetramethyldiaminodiethyl ether, bis-(dimethylaminopropyl)urea, N-methyl- or N-ethyl morpholine, N-coco-morpholine, N-cyclohexylmorpholine, N,N,N',N'-tetramethylethylene diamine, N,N,N',N'-tetramethyl-1,3-butanediamine, N,N,N',N'-tetramethyl-1,6-hexanediamine, pentamethyl diethylenetriamine, N-methyl piperidine, N-dimethylaminoethyl piperidine, N,N'-dimethyl piperazine, N-methyl-N'-dimethyl aminopiperazine, 1,8-diazabicyclo(5.4.0)undecene-7,1,2-dimethylimidazole, 2-methylimidazole, N,N-dimethylimidazole-β-phenylethylamine, 1,4-diazabicyclo-(2,2,2)-octane, bis-(N,N-dimethylaminoethyl) adipate; alkanolamine compounds, such as for example triethanolamine, triisopropanolamine, N-methyl- and N-ethyl diethanolamine, dimethylaminoethanol, 2-(N,N-dimethylaminoethoxy) ethanol, N,N',N''-tris-(dialkylaminoalkyl)hexahydrotriazines, for example N,N',N''-tris-(dimethylaminopropyl)-s-hexahydrotriazine and/or bis (dimethylaminoethyl) ether; metal salts, such as for example inorganic and/or organic compounds of iron, lead, bismuth, zinc and/or tin in conventional oxidation stages of the metal, for example iron(II) chloride, iron(III) chloride, zinc chloride, zinc-2-ethylcaproate, tin(II) octoate, tin(II) ethylcaproate, tin(II) palmitate, dibutyl tin(IV) dilaurate (DBTL), dibutyl dilauryl tin mercaptide, or lead octoate; amidines, such as for example 2,3-dimethyl-3,4,5,6-tetrahydropyrimidine; tetraalkylammonium hydroxides, such as for example tetramethylammonium hydroxide; alkali hydroxides, such as for example sodium hydroxide and alkali alcoholates, such as for example sodium methylate and potassium isopropylate, and alkali salts of long-chain fatty acids having 10 to 20 C atoms and optionally lateral OH groups.

Catalysts F) which are preferably used are tertiary amines and tin compounds of the cited type.

The catalysts cited by way of example can be used in the production of the lightfast polyurethane and/or polyurea compositions according to the invention individually or in the form of any mixtures with one another and are optionally used in amounts of 0.01 to 5.0 wt. %, preferably 0.1 to 2 wt. %, calculated as the total amount of catalysts used relative to the total amount of starting compounds used.

Compact mouldings are preferably produced by the process according to the invention. Through the addition of suitable blowing agents, however, foamed moulded articles can also be produced. Suitable blowing agents for this purpose are for example highly volatile organic substances, such as for example acetone, ethyl acetate, halogen-substituted alkanes, such as methylene chloride, chloroform, ethylidene chloride, vinylidene chloride, monofluorotrichloromethane, chlorotrifluoromethane or dichlorodifluoromethane, butane, hexane, heptane or diethyl ether and/or dissolved inert gases, such as for example nitrogen, air or carbon dioxide.

Water, compounds containing water of hydration, carboxylic acids, tert-alcohols, for example t-butanol, carbamates, for example the carbamates described in EP-A 1 000 955, in particular on page 2, lines 5 to 31 and page 3, lines 21 to 42, carbonates, for example ammonium carbonate and/or ammonium hydrogen carbonate and/or guanidine carbamate are suitable as chemical blowing agents F), i.e. blowing agents which form gaseous products on the basis of a reaction, for example with isocyanate groups. A blowing effect can also be achieved by the addition of compounds which undergo decomposition at temperatures above room temperature with release of gases, for example nitrogen, for example azo compounds such as azo dicarbonamide or azoisobutyric acid nitrile. Other examples of blowing agents and details of the use of blowing agents are described in Kunststoff-Handbuch, volume VII, edited by Vieweg and Höchtlen, Carl-Hanser-Verlag, Munich 1966, for example on pages 108 and 109, 453 to 455 and 507 to 510.

Surface-active additives F) can also additionally be used according to the invention as emulsifiers and foam stabilisers. Suitable emulsifiers are for example the sodium salts of castor oil sulfonates or fatty acids, salts of fatty acids with amines, such as for example oleic acid diethylamine or stearic acid diethanolamine. Alkali or ammonium salts of sulfonic acids, such as for example of dodecyl benzene sulfonic acids, fatty acids, such as for example ricinoleic acid, or polymeric fatty acids, or ethoxylated nonyl phenol can be incorporated as surface-active additives.

Suitable foam stabilisers are in particular the known, preferably water-soluble polyether siloxanes, as described for example by U.S. Pat. No. 2,834,748, DE-A 1 012 602 and DE-A 1 719 238. The polysiloxane-polyoxyalkylene copolymers branched via allophanate groups which are obtainable in accordance with DE-A 2 558 523 are also suitable foam stabilisers.

The aforementioned emulsifiers and stabilisers which can optionally be incorporated in the process according to the invention can be used both individually and in any combination with one another.

The articles obtained from the polyurethane and/or polyurea compositions for use according to the invention are characterised even in their original state, i.e. without the addition of corresponding stabilisers to the compositions on which they are based, by very good light resistance. Nevertheless, UV stabilisers (light stabilisers) or antioxidants of the known type can optionally be incorporated during their production as further auxiliary agents and additives F).

Suitable UV stabilisers F) are for example piperidine derivates, such as for example 4-benzoyloxy-2,2,6,6-tetramethylpiperidine, 4-benzoyloxy-1,2,2,6,6-pentamethylpiperidine, bis-(2,2,6,6-tetramethyl-4-piperidyl) sebacate, bis(1,2,2,6,6-pentamethyl-1-4-piperidinyl)sebacate, bis-(2,2,6,6-tetramethyl-4-piperidyl)suberate or bis-(2,2,6,6-tetramethyl-4-piperidyl)dodecanedioate, benzophenone derivatives, such as for example 2,4-dihydroxy, 2-hydroxy-4-methoxy, 2-hydroxy-4-octoxy, 2-hydroxy-4-dodecyloxy or 2,2'-dihydroxy-4-dodecyloxy benzophenone, benzotriazole derivatives, such as for example 2-(2'-hydroxy-3',5'-di-tert-amylphenyl)benzotriazole, oxalanilides, such as for example 2-ethyl-2'-ethoxy or 4-methyl-4'-methoxy oxalanilide, salicylic acid esters, such as for example salicylic acid phenyl ester, salicylic acid-4-tert-butylphenyl ester and salicylic acid-4-tert-octylphenyl ester, cinnamic acid ester derivatives, such as for example α-cyano-β-methyl-4-methoxycinnamic acid methyl ester, α-cyano-β-methyl-4-methoxycinnamic acid butyl ester, α-cyano-β-phenylcinnamic acid ethyl ester and α-cyano-β-phenylcinnamic acid isooctyl ester, or malonic ester derivatives, such as for example 4-methoxybenzylidene malonic acid dimethyl ester, 4-methoxybenzylidene malonic acid diethyl ester and 4-butoxybenzylidene malonic acid dimethyl ester. These light stabilisers can be used both individually and in any combination with one another.

Suitable antioxidants F) are for example the known sterically hindered phenols, such as for example 2,6-di-tert-butyl-4-methylphenol (ionol), pentaerythritol tetrakis(3-(3,5-di-tert-butyl-4-hydroxyphenyl)propionate, octadecyl-3-(3,5-di-tert-butyl-4-hydroxyphenyl)propionate, triethylene glycol-bis(3-tert-butyl-4-hydroxy-5-methylphenyl)propionate, 2,2'-thio-bis(4-methyl-6-tert-butylphenol), 2,2'-thiodiethyl-bis[3-(3,5-di-tert-butyl-4-hydroxyphenyl)]propionate, which can be used both individually and in any combination with one another.

Other auxiliary agents and additives F) which can optionally be incorporated are for example cell regulators of the type known per se, such as for example paraffins or fatty alcohols, the known flame retardants, such as for example tris-chloroethyl phosphate, ammonium phosphate or polyphosphate, fillers, such as for example barium sulfate, kieselguhr, carbon black, prepared calcium carbonate and also reinforcing glass fibres. Finally, the internal release agents, dyes, pigments, hydrolysis stabilisers, fungistatic and bacteriostatic substances known per se can optionally also be incorporated in the process according to the invention.

The cited auxiliary agents and additives F) which can optionally be incorporated can be added both to the polyisocyanate component A) and/or to the isocyanate group-reactive component E).

To produce the lightfast polyurethane and/or polyurea compositions according to the invention the polyisocyanate component A) is mixed with the isocyanate group-reactive component E), optionally with incorporation of the aforementioned auxiliary agents and additives F), in solvent-free form in the aforementioned NCO/OH ratio with the aid of suitable mixing units and cured by any method, in open or closed moulds, for example by simple casting by hand, but preferably with the aid of suitable machines, such as for example the low-pressure or high-pressure machines conventionally used in polyurethane technology, or by the RIM process, at a temperature of up to 160° C., preferably from 20 to 140° C., particularly preferably from 40 to 100° C., and optionally under elevated pressure of up to 300 bar, preferably up to 100 bar, particularly preferably up to 40 bar.

In order to reduce the viscosity values, the starting components A) and B) can optionally be preheated to a temperature of up to 120° C., preferably up to 100° C., particularly preferably up to 90° C., and optionally degassed by application of a vacuum.

The polyurethane and/or polyurea compositions produced in this way can generally be demoulded after a short time, for example after a time of 2 to 60 minutes. This can optionally be followed by a post-curing stage at a temperature of 50 to 100° C., preferably 60 to 90° C.

Compact or foamed, light-resistant and weather-resistant flexible polyurethane and/or polyurea compositions are obtained in this way which are characterised by high resistance to solvents and chemicals and excellent heat resistance, even at elevated temperatures of for example 90° C.

Whilst the polyurethane and/or polyurea compositions according to the invention combine high elasticity with high heat resistance, polyurethane compositions produced according to the prior art using conventional allophanate group-free HDI polyisocyanates, such as for example trimers or biurets, have a greater hardness and lower elasticity yet surprisingly a completely inadequate heat resistance. On the other hand, polyurethanes based on pure HDI polyester allophanates, such as can be obtained for example in accordance with EP-A 0 000 194, have elasticity values of a similar level to the polyurethane and/or polyurea compositions according to the invention but poor solvent and chemical resistance values. The desired combination of elasticity, high heat resistance and at the same time good chemical resistance can only be achieved with the polyisocyanate components used according to the invention.

The polyurethane and/or polyurea compositions according to the invention are suitable for many different applications, for example for the casting of optical, electronic or optoelectronic components, such as for example solar modules or light-emitting diodes, and in addition also for the production of seals, damping elements or articles made from soft integral foam.

EXAMPLES

Unless otherwise specified, all percentages are based on weight.

The NCO contents were determined by titrimetry in accordance with DIN EN ISO 11909.

OH values were determined by titrimetry by reference to DIN 53240 Part 2, acid values in accordance with DIN 3682.

The residual monomer contents were measured in accordance with DIN EN ISO 10283 by gas chromatography using an internal standard.

All viscosity measurements were performed using a Physica MCR 51 rheometer from Anton Paar Germany GmbH (DE) in accordance with DIN EN ISO 3219.

The Hazen colour number was measured by spectrophotometry in accordance with DIN EN 1557 using a LICO 400 spectrophotometer from Lange, DE.

The stated degrees of allophanatisation (percentage of urethane groups forming as intermediates from the hydroxyl groups of component B) which are converted to allophanate groups) and the molar isocyanurate/allophanate group ratios are the values calculated from the 13C-NMR data.

The glass transition temperature Tg was determined by DSC (differential scanning calorimetry) using a Mettler DSC 12E (Mettler Toledo GmbH, Giessen, DE) at a heating-up rate of 10° C./min.

Shore hardness values were measured in accordance with DIN 53505 using a Zwick 3100 Shore hardness tester (Zwick, DE).

CIE Lab values (DIN 6174), yellowness index (ASTM E 313) and transmission measurements were determined using a Lambda 900 spectrophotometer with integrating sphere (150 mm) from Perkin-Elmer, USA (0°/diffuse, reference: air T=100%).

Exposure to xenon light was performed in accordance with DIN EN ISO 11431 in a Suntest CPS (Atlas, USA) with a Suprax daylight filter (UV edge at 290 nm, black panel temperature=48° C.). CIE Lab and ΔE values were determined as a measure of changes in shade.

Production of Starting Compounds

Polyisocyanate A1)

Production of a Polyester Diol B1)

5730 g (50.3 mol) of ε-caprolactone, 1270 g (10.8 mol) of 1,6-hexanediol and 0.35 g of tin(II)-2-ethylhexanoate were heated in a nitrogen-flushed reactor for 4 hours at 160° C. whilst stirring. After cooling to room temperature a liquid polyester diol was obtained having the following characteristics:

Viscosity (23° C.): 330 mPas
OH value: 172.4 mg KOH
Acid value: 0.6 mg KOH
Colour number (APHA): 30 Hazen
Average molecular weight: 650 g/mol (calculated from OH value)

Production of Polyisocyanate A1)

650 g (1.0 mol) of the polyester diol B1) described above were added to 1596 g (9.5 mol) of hexamethylene diisocyanate (HDI) at a temperature of 90-100° C. under dry nitrogen and the mixture was stirred for 3 hours until an NCO content of 31.8%, corresponding to complete urethanisation, was achieved. After cooling the reaction mixture to 65° C. the allophanatisation reaction and a simultaneous trimerisation was initiated by the continuous addition of 15 ml of a 0.75% solution of N,N,N-trimethyl-N-benzylammonium hydroxide in a 1:1 mixture of 2-ethyl hexanol and 2-ethyl hexane-1,3-diol over a period of 90 min. After this time the NCO content of the reaction mixture was 22.8%. The catalyst was deactivated by adding 0.5 g of a 10% dibutyl phosphate solution in HDI and the unreacted monomeric HDI was separated off in a film evaporator at a temperature of 130° C. and under a pressure of 0.1 mbar. 1630 g of a viscous, colourless allophanate and isocyanurate group-containing polyisocyanate with the following characteristics were obtained:

NCO content: 11.5%
NCO functionality (calc.): approx. 3.7
Viscosity (23° C.): 7200 mPas
Monomeric HDI: 0.07%
Colour number (APHA): 30 Hazen
Degree of allophanatisation: 68%
Isocyanurate/allophanate groups: 35:65 (molar)
Polyisocyanate A2)
Production of a Polyester Diol B2)

1160 g (9.8 mol) of 1,6-hexanediol, 1334 g of neopentyl glycol (12.8 mol) and 2662 g (18.2 mol) of adipic acid were weighed together into a reactor fitted with a stirrer, heater, automatic temperature control, nitrogen inlet, column, water separator and receiver and heated to 200° C. whilst stirring and passing through nitrogen such that the temperature at the head of the column did not exceed 103° C. When distillation of the theoretically calculated amount of reaction water (656 g) was finished the water separator was replaced by a distillation connector and the reaction mixture was stirred at 200° C. until the temperature at the head of the column had fallen below 90° C. The column was removed and the product was condensed further until an acid value of ≤2 mg KOH/g was reached. A polyester diol which was liquid at room temperature was obtained with the following characteristics:

Viscosity (23° C.): 4065 mPas
OH value: 89 mg KOH/g
Acid value: 1.5 mg KOH/g
Colour number (APHA): 16 Hazen
Average molecular weight: 1260 g/mol (calculated from OH value)
Production of Polyisocyanate A2)

672 g (4 mol) of HDI and 177 g (0.14 mol) of the polyester diol B2) were reacted by the method described for the starting polyisocyanate A1) and using the catalyst solution described therein until an NCO content of 33.5% was achieved. Following deactivation of the catalyst and subsequent removal of the unreacted monomeric HDI by distillation using a short-path evaporator at 130° C. and 0.1 mbar, 365 g of a viscous, colourless allophanate and isocyanurate group-containing polyisocyanate having the following characteristics were obtained:

NCO content: 11.3%
NCO functionality (calc.): approx. 3.7
Viscosity (23° C.): 7850 mPas
Monomeric HDI: 0.05%
Colour number (APHA): 27 Hazen
Degree of allophanatisation: 69%
Isocyanurate/allophanate groups: 32:68
Polyisocyanate A3)

588 g (3.5 mol) of HDI and 278 g (0.37 mol) of a commercially available poly-ε-caprolactonediol (CAPA® 2077 A from Perstorp, Sweden; average molecular weight 750) were reacted by the method described for starting polyisocyanate A1) and using the catalyst solution described therein until an NCO content of 23.7% was achieved. Following deactivation of the catalyst and subsequent removal of the unreacted monomeric HDI by distillation using a short-path evaporator at 130° C. and 0.1 mbar, 369 g of a viscous, colourless allophanate and isocyanurate group-containing polyisocyanate having the following characteristics were obtained:

NCO content: 11.2%
NCO functionality (calc.): approx. 3.8
Viscosity (23° C.): 6300 mPas
Monomeric HDI: 0.05%
Colour number (APHA): 27 Hazen
Degree of allophanatisation: 68%
Isocyanurate/allophanate groups: 20:80
Polyisocyanate A4)

181 g (0.24 mol) of the commercially available poly-ε-caprolactonediol (CAPA® 2077 A) described in the production of starting polyisocyanate A3) were added to 756 g (4.5 mol) of HDI at a temperature of 90-100° C. under dry nitrogen and the mixture was stirred for 3 hours until an NCO content of 38.2%, corresponding to complete urethanisation, was achieved. Then the reaction mixture was heated to 95° C. and 0.2 g of zinc(II)-2-ethyl-1-hexanoate were added as allophanatisation catalyst. Owing to the exothermic start to the reaction the temperature of the mixture rose to 110° C. After approx. 30 min the NCO content of the reaction mixture was 34.8%. The catalyst was deactivated by adding 0.2 g of benzoyl chloride and the unreacted monomeric HDI was separated off in a film evaporator at a temperature of 130° C. and under a pressure of 0.1 mbar. 388 g of a viscous, colourless allophanate and isocyanurate group-containing polyisocyanate with the following characteristics were obtained:

NCO content: 11.3%
NCO functionality (calc.): approx. 3.7
Viscosity (23° C.): 6500 mPas
Monomeric HDI: 0.07%
Colour number (APHA): 47 Hazen
Degree of allophanatisation: 93%
Isocyanurate/allophanate groups: 18:82
Comparative Polyisocyanate V1)

756 g (4.5 mol) of HDI were placed under dry nitrogen with 100 ppm of zirconium(II)-2-ethyl hexanoate as allophanatisation catalyst at 110° C. and mixed with 181 g (0.24 mol) of the commercially available poly-ε-caprolactonediol (CAPA® 2077 A) described in the production of starting polyisocyanate A3) within 1.5 hours. After a further 3 hours at 110° C. the NCO content of the reaction mixture was 35.9%. The catalyst was deactivated by adding 250 ppm of benzoyl chloride and the unreacted monomeric HDI was separated off in a film evaporator at a temperature of 130° C. and under a pressure of 0.1 mbar. 350 g of a viscous, colourless allophanate group-containing polyisocyanate with the following characteristics were obtained:

NCO content: 11.8%
NCO functionality (calc.): approx. 3.9
Viscosity (23° C.): 3200 mPas
Monomeric HDI: 0.08%
Colour number (APHA): 33 Hazen
Degree of allophanatisation: 98%
Isocyanurate/allophanate groups: 2:98
Comparative Polyisocyanate V2)

Isocyanurate group-containing HDI polyisocyanate (Desmodur® N 3300, manufactured by Bayer MaterialScience, DE) with the following characteristics:

NCO content: 21.8%
Viscosity (23° C.): 3050 mPas
Free HDI: 0.09%
Colour number (APHA): 8 Hazen
Degree of allophanatisation: -
Isocyanurate/allophanate groups: 100:0
Hydroxy-Functional Reaction Partner E1)
Component a)

3112 g (34.6 mol) of 1,3-butanediol, 1863 g (17.9 mol) of neopentyl glycol, 2568 g (19.2 mol) of trimethylolpropane and 6706 g (40.4 mol) of isophthalic acid were weighed together into a reactor fitted with a stirrer, heater, automatic temperature control, nitrogen inlet, column, water separator and receiver and heated to 200° C. whilst stirring and passing through nitrogen such that the temperature at the head of the column did not exceed 102° C. When distillation of the theoretically calculated amount of reaction water (1649 g) was finished the water separator was replaced by a distillation connector and the reaction mixture was stirred at 200° C. until the product had an acid value of ≤5 mg KOH/g. A polyester polyol which was highly viscous at room temperature was obtained with the following characteristics:

Flow time (23° C.): 29 s as a 55% solution in MPA (ISO 2431)
OH value: 335 mg KOH/g
Acid value: 4.7 mg KOH/g
Colour number (APHA): 27 Hazen
Average molecular weight: 435 g/mol (calculated from OH value)

Component b)

4034 g (35.4 mol) of ε-caprolactone, 9466 g (70.6 mol) of trimethylolpropane and 6.75 g of tin(II)-2-ethyl hexanoate were mixed together under dry nitrogen and heated for 4 hours at 160° C. After cooling to room temperature a liquid polyester diol was obtained having the following characteristics:

Viscosity (23° C.): 4600 mPas
OH value: 886 mg KOH/g
Acid value: 0.4 mg KOH/g
Colour number (APHA): 42 Hazen
Average molecular weight: 190 g/mol (calculated from OH value)

Production of the Hydroxy-Functional Reaction Partner E1)

6300 g of component a), 6300 g of component b) and 1400 g of dipropylene glycol were stirred together in a stirred-tank reactor for 1 hour at 60° C. The hydroxy-functional reaction partner E1) was obtained with the following characteristics:

Viscosity (23° C.): 19,900 mPas
OH value: 628 mg KOH/g
Acid value: 2.2 mg KOH/g
Colour number (APHA): 64 Hazen
Average molecular weight: 243 g/mol (calculated from OH value)

Hydroxy-Functional Reaction Partner E2)

Polyester diol B1) described as the starting component for the production of polyisocyanate A1).

Examples 1 to 7

According to the Invention and Comparative

Production of Potting Compounds

In order to produce potting compounds, polyisocyanate components and polyol components, optionally with incorporation of DBTL as catalyst, in the combinations and proportions (parts by weight) specified in Table 1, corresponding in each case to an equivalents ratio of isocyanate groups to hydroxyl groups of 1:1, were homogenised using a SpeedMixer DAC 150 FVZ (Hauschild, DE) for 1 min at 3500 rpm and then poured by hand into open, unheated polypropylene moulds. After curing for 30 minutes at room temperature or at 70° C. in a drying oven the specimens (diameter 50 mm, height 5 mm) were demoulded.

After a post-curing time of 24 hours the specimens were tested for their mechanical and optical properties. For a rapid assessment of the heat resistance the Shore hardness was measured on a sample heated to 80° C. and the difference from the Shore hardness of the same sample measured at room temperature was calculated. In order to assess the chemical resistance the samples were stored for up to 7 days in acetone and visually assessed and rated ("very good"=no visible change after 7 days; "good"=no visible change after 1 day; "moderate"=sample attacked after 1 day). The test results can be found in Table 1.

TABLE 1

| | Example | | | | | | |
|---|---|---|---|---|---|---|---|
| | 1 | 2 | 3 | 4 | 5 | 6 (comp) | 7 (comp) |
| Polyisocyanate A1) | 80.4 | — | — | — | 52.4 | — | — |
| Polyisocyanate A2) | — | 79.8 | — | — | — | — | — |
| Polyisocyanate A3) | — | — | 80.0 | — | — | — | — |
| Polyisocyanate A4) | — | — | — | 80.6 | — | — | — |
| Comparative polyisocyanate V1) | — | — | — | — | — | 80.0 | — |
| Comparative polyisocyanate V2) | — | — | — | — | — | — | 68.4 |
| Polyol E1) | 19.6 | 19.2 | 19.0 | 19.4 | — | 20.0 | 31.6 |
| Polyol E2) | — | — | — | — | 46.6 | — | — |
| DBTL | — | 1.0 | 1.0 | — | 1.0 | — | — |
| Curing temperature [° C.] | 70 | 25 | 25 | 70 | 25 | 70[a] | 70 |
| Tg [° C.] | 7 | −2 | −5 | 12 | −33 | 10 | 92 |
| Shore hardness A/D | 79/31 | 80/28 | 79/36 | 78/25 | 60/20 | 75/23 | —/84 |
| Δ Shore hardness A (80° C.) | −3% | −1% | −1% | −4% | −5% | −43% | −54%[b] |
| Chemical resistance | very good | very good | very good | good | good | moderate | good |
| ΔE after 400 h xenon test | 7.4 | 6.9 | 9.0 | 8.2 | 7.2 | 8.4 | 8.0 |

[a]Release time 80 min
[b]Δ Shore hardness D

The examples show that according to the invention (Examples 1 to 5), flexible, highly elastic, lightfast and chemical-resistant polyurethane potting compounds having excellent heat resistance are obtained using polyisocyanates produced by reacting HDI with amounts in molar deficit of polyester alcohols, with allophanatisation and simultaneous trimerisation. By contrast, in analogous formulations ester group-containing HDI polyisocyanates having an exclusively allophanate structure (Example 6, comparative) yield polyurethane compositions having poor heat resistance and inadequate chemical resistance, whilst the use of allophanate group-free HDI polyisocyanurates (Example 7, comparative) leads not to flexible but to very hard and brittle potting compounds.

Example 8

The potting compound from Example 1 was poured into a heatable mould (195×290×4 mm) using a laboratory metering unit under the conditions specified in Table 2.

TABLE 2

| Processing parameters | |
|---|---|
| Polyisocyanate A1) [a] | 100 parts by wt. |
| Polyol E1) [a] | 24 parts by wt. |
| Mould temperature | 70° C. |
| Casting time (approx.) | approx. 360 s |
| Release time (approx.) | approx. 35 min |
| Post-curing (time/temperature) | 12 h/65° C. |

[a] Processing temperature in each case 65° C.

Specimens were cut out of the sample sheets obtained in this way and were subjected to further mechanical and thermal tests, the results of which are shown in Tables 3 and 4.

TABLE 3

| Mechanical properties | |
|---|---|
| Shore hardness A/D | 79/26 |
| Density (DIN 53479) | 1.17 g/cm$^3$ |
| Flexural modulus of elasticity (DIN ISO EN 178) | 13N/mm$^2$ |
| Tear strength (tensile test, DIN 53504) | 6 MPa |
| Ultimate elongation (tensile test, DIN 53504) | 74% |
| Puncture test (with lubricant) (DIN EN ISO 6603-2) | 2300N |
| Impact resilience (DIN 53512) | 17% |

TABLE 4

| Thermal properties | |
|---|---|
| Coefficient of linear thermal expansion (2$^{nd}$ pass) (TM900026) | $186 \cdot 10^{-6}$ 1/K |
| Preferred measuring range: −20 to 120° C. | |
| Coefficient of linear thermal expansion, 2$^{nd}$ pass (ASTM E831) | $203 \cdot 10^{-6}$ 1/K |
| Preferred measuring range up to 55° C. | |
| Coefficient of linear thermal expansion, 2$^{nd}$ pass (ASTM D696-91) | $155 \cdot 10^{-6}$ 1/K |
| Preferred measuring range −30 to 30° C. | |

Example 9

A specimen produced as described in Example 1 at a sample temperature of 90° C. was exposed to white LED light at a distance of 2 mm. Table 5 shows the changes in transmission, shade of colour (CIE Lab values) and yellowness (yellowness index YI) over the period of exposure to light. The high transparency showing little change over time (~90% transmission) and the low yellowness in particular demonstrate the excellent suitability of the polyisocyanates according to the invention for the production of elastic potting compounds for the encapsulation of light-emitting diodes.

TABLE 5

| Exposure time [h] | 0 | 406 | 1936 |
|---|---|---|---|
| Ty [%] (D6510°) | 89.21 | 89.80 | 89.14 |
| YI (D6510°) | 1.13 | 0.99 | 1.32 |
| L* (D6510°) | 95.67 | 95.91 | 95.64 |
| a* (D6510°) | −0.07 | −0.07 | −0.07 |
| b* (D6510°) | 0.63 | 0.55 | 0.71 |
| deltaTy | — | 0.59 | −0.08 |
| deltaYI | — | −0.14 | 0.19 |

The invention claimed is:

1. A lightfast compact or foamed polyurethane and/or polyurea article produced by a method comprising forming a mixture of
    polyisocyanate components A), comprising a molar ratio of the sum of uretdione and isocyanurate structures to allophanate groups of from 15:85 to 55:45,
    optionally D) further aliphatic and/or cycloaliphatic polyisocyanates, and E) reaction partners having an average functionality of 2.0 to 6.0 which are reactive with isocyanate groups, and,
    optionally, F) an auxiliary agent or additive selected from the group consisting of blowing agents, surface-active agents, UV stabilisers, foam stabilisers, antioxidants and release agents, wherein components A)-E) are provided such that an equivalents ratio of isocyanate groups to isocyanate-reactive groups of 0.5:1 to 2.0:1 is maintained,
    and wherein polyisocyanate components A) are obtained by the reaction of 1,6-diisocyanatohexane with component B) comprising a polyester diol obtained by ring-opening polymerisation of ε-caprolactone, in the presence of zinc carboxylates as catalysts C), termination of the reaction at a desired degree of conversion, and removal of excess unreacted 1,6 diisocyanatohexane,
    pouring the mixture into a mould,
    curing the mixture in the mould to form a
    lightfast compact or foamed polyurethane and/or polyurea article.

2. The lightfast compact or foamed polyurethane and/or polyurea article according to claim 1, wherein the ester group-containing hydroxy-functional component B) has an average molecular weight, calculable from the functionality and hydroxyl value, of 134 to 3000 and an average OH functionality of 1.8 to 4.0.

3. The lightfast compact or foamed polyurethane and/or polyurea article according to claim 1, wherein the reaction of 1,6-diisocyanatohexane with an ester group-containing hydroxy-functional component B) maintains an equivalents ratio of isocyanate groups to hydroxyl groups of 4:1 to 50:1.

4. The lightfast compact or foamed polyurethane and/or polyurea article according to claim 1, wherein the catalysts C) comprise zinc(II)-n-octanoate, zinc(II)-2-ethyl-1-hexanoate and/or zinc(II) stearate.

5. The lightfast compact or foamed polyurethane and/or polyurea article according to claim 1, wherein the reaction is terminated at a desired degree of conversion by addition of a stopper.

6. The lightfast compact or foamed polyurethane and/or polyurea article according to claim 1, wherein unreacted monomeric 1,6-diisocyanatohexane is separated from the reaction product by extraction or film distillation.

7. The lightfast compact or foamed polyurethane and/or polyurea article according to claim 6, wherein the polyurethane and/or polyurea article is a solar module.

8. The lightfast compact or foamed polyurethane and/or polyurea article according to claim 1, wherein the polyurethane and/or polyurea article is a light-emitting diode.

9. The lightfast compact or foamed polyurethane and/or polyurea article according to claim 1, wherein the polyurethane and/or polyurea article is a seal or a damping element.

10. The lightfast compact or foamed polyurethane and/or polyurea article according to claim 1, wherein the polyurethane and/or polyurea articles are flexible integral foam articles.

11. The lightfast compact or foamed polyurethane and/or polyurea article according to claim 1, wherein the auxiliary agents and additives comprise water as a blowing agent.

12. The lightfast compact or foamed polyurethane and/or polyurea article according to claim 1, wherein the degree of allophanatisation of polyisocyanate component A) is at least 40%.

13. A process for the production of lightfast polyurethane and/or polyurea articles by solvent-free reaction of
A) a polyisocyanate component, comprising a molar ratio of the sum of uretdione and isocyanurate structures to allophanate groups of from 15:85 to 55:45, obtained by reacting 1,6-diisocyanatohexane with component B) comprising a polyester diol obtained by ring-opening polymerisation of E-caprolactone, in the presence of zinc carboxylates as catalysts C), termination of the reaction at a desired degree of conversion and, and removal of excess unreacted 1,6-diisocyanatohexane, optionally together with
D) further aliphatic and/or cycloaliphatic polyisocyanates, and
E) reaction partners having an average functionality of 2.0 to 6.0 which are reactive to isocyanate groups, and optionally
F) further auxiliary agents and additives selected from the group consisting of blowing agents, surface-active agents, UV stabilisers, foam stabilisers, antioxidants and release agents,
wherein components A)-E) are provided such that an equivalents ratio of isocyanate groups to isocyanate-reactive groups of 0.5:1 to 2.0:1 is maintained
to form a mixture,
pouring the mixture into a mould,
curing the mixture in the mould to form a lightfast compact or foamed polyurethane and/or polyurea article.

14. The process according to claim 13, wherein the reaction partners E) comprise hydroxy-, amino- and/or mercapto-functional compounds having an average molecular weight of 62 to 12,000.

15. The process according to claim 13, wherein the reaction partners E) comprise polyether polyols, polyester polyols, polycarbonate polyols, amino polyethers having an average molecular weight of 500 to 12,000, polythioether thiols, polyester thiols, low-molecular-weight hydroxy- and/or amino-functional components having an average molecular weight of 62 to 500, or mixtures thereof.

16. The process according to claim 13, wherein the further auxiliary agents and additives comprise water as a blowing agent.

17. The process according to claim 13, wherein the reaction of the reaction partners with the polyisocyanate component is performed at a temperature of up to 160° C. and under a pressure of up to 300 bar.

\* \* \* \* \*